United States Patent
Liu et al.

(10) Patent No.: US 9,870,769 B2
(45) Date of Patent: Jan. 16, 2018

(54) ACCENT CORRECTION IN SPEECH RECOGNITION SYSTEMS

(71) Applicant: International Business Machines Corporation, Armonk, NY (US)

(72) Inventors: Su Liu, Austin, TX (US); Yi Liu, Beijing (CN); Cheng Xu, Beijing (CN); Shi Lei Zhang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 78 days.

(21) Appl. No.: 14/955,311

(22) Filed: Dec. 1, 2015

(65) Prior Publication Data
US 2017/0154622 A1    Jun. 1, 2017

(51) Int. Cl.
| G10L 15/06 | (2013.01) |
| G10L 15/00 | (2013.01) |
| G10L 15/26 | (2006.01) |
| G10L 15/187 | (2013.01) |
| G10L 15/02 | (2006.01) |
| G10L 15/07 | (2013.01) |

(52) U.S. Cl.
CPC .......... *G10L 15/187* (2013.01); *G10L 15/02* (2013.01); *G10L 15/063* (2013.01); *G10L 15/075* (2013.01); *G10L 2015/022* (2013.01); *G10L 2015/0635* (2013.01)

(58) Field of Classification Search
None
See application file for complete search history.

(56) References Cited

U.S. PATENT DOCUMENTS

| 4,907,279 | A   | 3/1990 | Higuchi et al. |
| 6,366,882 | B1* | 4/2002 | Bijl ............................ G06F 3/16 704/231 |
| 6,912,498 | B2* | 6/2005 | Stevens .................... G10L 15/22 704/235 |
| 7,315,818 | B2* | 1/2008 | Stevens .................... G10L 15/22 704/235 |
| 7,315,821 | B2  | 1/2008 | Monchi et al. |
| 7,593,849 | B2* | 9/2009 | Das .......................... G10L 15/07 704/224 |
| 8,170,878 | B2  | 5/2012 | Liu et al. |
| 8,175,882 | B2  | 5/2012 | Basson et al. |
| 8,401,856 | B2  | 3/2013 | Jennings et al. |
| 8,423,364 | B2* | 4/2013 | Yu .......................... G10L 15/063 704/231 |

(Continued)

FOREIGN PATENT DOCUMENTS

JP    2008268478 A    11/2008

OTHER PUBLICATIONS

Angkititrakul et al., "Advances in Phone-Based Modeling for Automatic Accent Classification", IEEE Transactions on Audio, Speech, and Language Processing, vol. 14, No. 2, Mar. 2006, pp. 634-646.

(Continued)

*Primary Examiner* — Satwant Singh
(74) *Attorney, Agent, or Firm* — Gilbert Harmon, Jr.

(57) ABSTRACT

A method comprising receiving an audio input signal comprising speech, determining an accent class corresponding to the speech, identifying an accented phone pattern within the speech, replacing the accented phone pattern with an unaccented phone pattern, and generating an unaccented output signal from the unaccented phone pattern.

14 Claims, 4 Drawing Sheets

(56) References Cited

U.S. PATENT DOCUMENTS

| | | | |
|---|---|---|---|
| 8,731,928 B2 | 5/2014 | Rajput et al. | |
| 8,744,771 B2* | 6/2014 | Slusar | G01C 21/3608 |
| | | | 701/419 |
| 8,849,666 B2 | 9/2014 | Jaiswal et al. | |
| 9,372,093 B2* | 6/2016 | Slusar | G01C 21/3608 |
| 2007/0038455 A1 | 2/2007 | Murzina et al. | |
| 2008/0147404 A1 | 6/2008 | Liu et al. | |
| 2012/0016671 A1* | 1/2012 | Jaggi | G10L 15/22 |
| | | | 704/235 |
| 2013/0132083 A1* | 5/2013 | Yu | G10L 15/063 |
| | | | 704/243 |
| 2013/0262111 A1* | 10/2013 | Eller | G10L 15/26 |
| | | | 704/235 |
| 2014/0129218 A1 | 5/2014 | Liu et al. | |
| 2015/0006170 A1 | 1/2015 | Caskey et al. | |
| 2016/0273933 A1* | 9/2016 | Slusar | G01C 21/3608 |

OTHER PUBLICATIONS

Zhao et al., "Accent Reduction for Computer-Aided Language Learning", 20th European Signal Processing Conferences (EUSIPCO 2012), Bucharest, Romania, Aug. 27-31, 2012, pp. 335-339.

"Accent Modification", American Speech-Language-Hearing Association, © 1997-2015, <http://www.asha.org/public/speech/development/accent-modification/>, printed on Jul. 16, 2015, 1 page.

"Watson Paths", IBM Research Cognitive computing, IBM®, <http://www.research.ibm.com/cognitive-computing/watson/watsonpaths.shtml#fbid=vnhwuXO-HEt>, printed on Jul. 16, 2015, 3 pages.

\* cited by examiner

ACCENT CORRECTION IN SPEECH RECOGNITION SYSTEMS

BACKGROUND OF THE INVENTION

The present invention relates generally to the field of natural language processing, and more specifically to adjusting speech in the presence of an accent.

Natural language processing plays an important role in many fields. For example, speech recognition systems can be a key component of data entry for some medical record databases. In these cases, the accuracy of the database is directly related to the accuracy and reliability of the speech recognition systems utilized. Even in the most reliable systems, errors may result from a speaker's irregular speech pattern or accent. Often, records processed by speech recognition systems must be checked or edited manually by a user to minimize such errors.

SUMMARY

As disclosed herein, a method for generating an unaccented output signal corresponding to a received speech includes receiving an audio input signal comprising speech, determining an accent class corresponding to the speech, identifying an accented phone pattern within the speech, replacing the accented phone pattern with an unaccented phone pattern, and generating an unaccented output signal from the unaccented phone pattern. A computer program product and computer system corresponding to the method are also disclosed.

DETAILED DESCRIPTION

In some natural language processing environments, the benefit of a speech recognition system is to eliminate the need for manually interacting with data input. If a user needs to manually check the records as created by a speech recognition system, then the benefit of requiring no user interaction with the records is lost. Systems with increased accuracy may minimize the need for manual error checking, and therefore may maintain the benefits of not needing additional user interaction.

In some cases, errors in speech recognition systems may be caused by a speaker's speech pattern differing from a standard, unaccented pattern. These variations in pronunciation may cause a speech recognition system to interpret a speaker's words incorrectly, leading to an incorrect transcription. For this reason, the ability to identify an accent and adjust audio input with respect to the accent may enable a system to more accurately transcribe speech.

Figure 1:
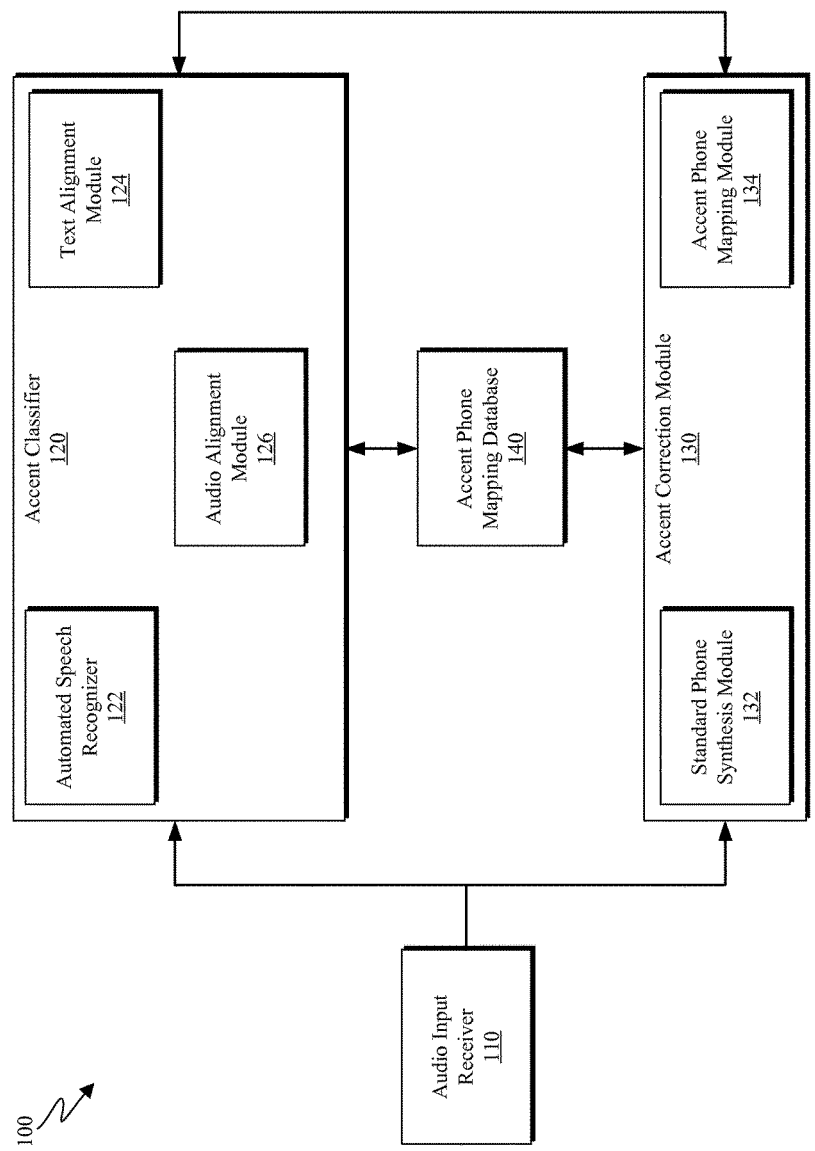
FIG. 1 is a block diagram depicting one embodiment of a speech correction environment in accordance with some embodiments of the present invention.

FIG. 1 is a block diagram depicting one embodiment of a speech correction environment in accordance with some embodiments of the present invention. As depicted, speech correction environment 100 includes an audio input receiver 110, an accent classifier 120, an accent correction module 130, and accent phone mapping database 140. Speech correction environment may enable a user's speech to be adjusted to remove any accented or abnormal speech patterns.

Audio input receiver 110 may include any existing hardware capable of receiving an audio input signal. Audio input receiver 110 may be a microphone capable of receiving the audio input directly. In other embodiments, audio input receiver 110 is a module configured to receive an audio signal that has been recorded elsewhere and is transmitted digitally to audio input receiver 110. The audio signal received by audio input receiver 110 may include speech. Audio input receiver 110 may be further configured to provide an audio signal to accent classifier 120 and accent correction module 130.

Accent classifier 120 may be a module configured to detect and identify an accent present in speech received by audio input receiver 110. As depicted, accent classifier 120 includes automated speech recognizer 122, text alignment module 124, and audio alignment module 126. Accent classifier 120 may be further configured to receive an audio signal from audio input receiver 110.

Automated speech recognizer 122 may be configured to identify speech from within the audio signal received from audio input receiver 110. In some embodiments, the received audio signal may include sounds that do not correspond to speech. In said embodiments, automated speech recognizer 122 identifies the sections that correspond to speech from within the audio signal, and analyzes these sections at a phone level. The speech may be analyzed to isolate the phones present in the speech, and these phones may be provided to text alignment module 124 and audio alignment module 126. Automated speech recognizer 122 may further be configured to determine an accent corresponding to the speech existing in the received audio signal.

Text alignment module 124 may be configured to analyze the received speech to provide a phone level transcription of the speech. In some embodiments, text alignment module 124 is further configured to query accent phone mapping database 140 to identify any phones that are accented. With respect to accent map creation, text alignment module 124 may also be configured to compare an unaccented transcription to a prepared text dictation transcription to identify phones that differ.

Audio alignment module 126 may be configured to analyze the received speech to provide a partitioned audio signal corresponding to the speech. In some embodiments, the partitioned audio signal is segmented according to phone patterns. Partitioning the audio signal into segments that each include a single phone or phone pattern enables accented phones to be replaced by unaccented phones. With respect to accent map creation, audio alignment module 126 may further be configured to compare an acoustic model of an accented speech to an acoustic model of an unaccented speech to identify phones that differ between the two.

Accent correction module 130 may be configured to generate an unaccented audio signal corresponding to the received speech. As depicted, accent correction module 130 includes a standard phone synthesis module 132 and an accent phone mapping module 134. Accent correction module 130 may enable an accented audio signal to be adjusted to provide an unaccented audio signal.

Standard phone synthesis module 132 may be configured to provide appropriate unaccented phones to replace identified accented phones. In one embodiment, standard phone synthesis module may be a database from which the necessary unaccented phones can be retrieved by accent phone mapping module 134. In some embodiments, where phone patterns comprising multiple phones are to be replaced, standard phone synthesis module may be further configured to combine the appropriate unaccented phones to create an unaccented phone pattern. Standard phone synthesis module 132 may then provide the unaccented phone pattern to accent phone mapping module 134.

Accent phone mapping module 134 may be configured to stitch the appropriate unaccented phones alongside the unaltered phones from the audio input to provide an unaccented audio signal. In one embodiment, accent phone mapping module 134 is configured to place each unaccented phone in place of one or more accented phones to which it corresponds. The resulting unaccented audio signal may be provided to a user.

Accent phone mapping database 140 may comprise any storage medium known in the art configured to store an accent phone map. The accent phone map may indicate which accented phones are to be replaced by which unaccented phones. Accent phone mapping database 140 may be configured according to an accent phone mapping method, such as accent phone mapping method 300 described with respect to FIG. 3.

Figure 2:
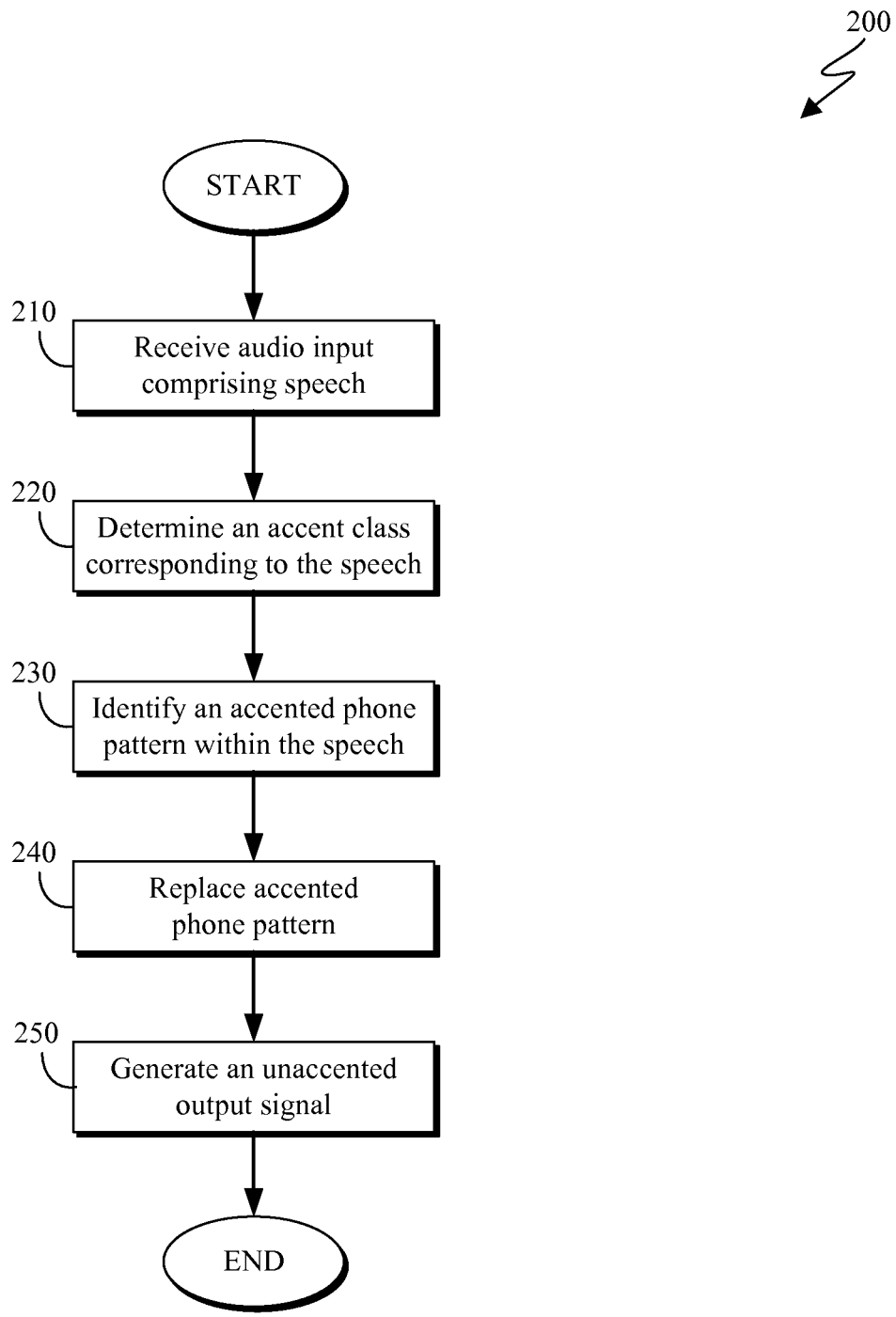
FIG. 2 is a flowchart depicting one embodiment of a speech correction method in accordance with some embodiments of the present invention.

FIG. 2 is a flowchart depicting one embodiment of a speech correction method 200 in accordance with some embodiments of the present invention. As depicted, speech correction method 200 comprises receiving (210) audio input comprising speech, determining (220) an accent class corresponding to the speech, identifying (230) an accented phone pattern within the speech, replacing (240) the accented phone pattern, and generating (250) an unaccented output signal. Speech correction method 200 may enable the creation of an unaccented audio output corresponding to an accented speech.

Receiving (210) audio input comprising speech may include directly receiving speech via a microphone or other hardware capable of receiving audio signals. In other embodiments, receiving (210) audio input comprising speech includes digitally receiving audio that has been recorded elsewhere and converted to digitally transmittable signal. Receiving (210) audio input may also comprise identifying one or more portions of the audio input that include speech.

Determining (220) an accent class corresponding to the speech may include comparing phone patterns present in the speech to phone patterns stored in an accent phone mapping database. The accent phone mapping database may be a database comprising prepared text dictations corresponding to a plurality of accents that have been analyzed at the phone level to provide phone level error detection. That is, the accented prepared text dictations may be compared to an unaccented prepared text dictation such that phones that differ for each accent can be identified and stored. In one embodiment, comparisons may be made with respect to an acoustic model of each prepared text dictation.

Identifying (230) an accented phone pattern within the speech may include identifying a phone pattern within the speech that corresponds to an accented phone pattern as indicated in an accent phone mapping database. Identifying (230) an accented phone pattern may comprise comparing a set of phone patterns present in the speech included in the audio to a set of accented phone patterns as included in an accent phone mapping database. A phone pattern that is present in both the speech and the accent phone mapping database may be identified to be replaced.

Replacing (240) the accented phone pattern may include, for an accented phone pattern of interest that is present in the speech, identifying an unaccented phone pattern corresponding to the accented phone pattern. In one embodiment, the unaccented phone pattern may be indicated in an accent phone mapping module. An accent phone mapping module may be configured to create a map from an accented phone pattern to an unaccented phone pattern. In one embodiment, the accent phone mapping module may additionally be configured to store and provide unaccented phone patterns. In another embodiment, the accent phone module is additionally configured to send a request to a standard phone synthesis module for an unaccented phone pattern. The standard phone synthesis module may be configured to combine a series of unaccented phones that have been recorded and stored in the standard phone synthesis module to create an unaccented phone pattern corresponding to the accented phone pattern of interest.

Generating (250) an unaccented output signal may include providing a signal corresponding to the speech wherein one or more accented phone patterns have been replaced by unaccented phone patterns as described previously. The unaccented output signal may be provided to an audio output device capable of playing the output signal.

Figure 3:
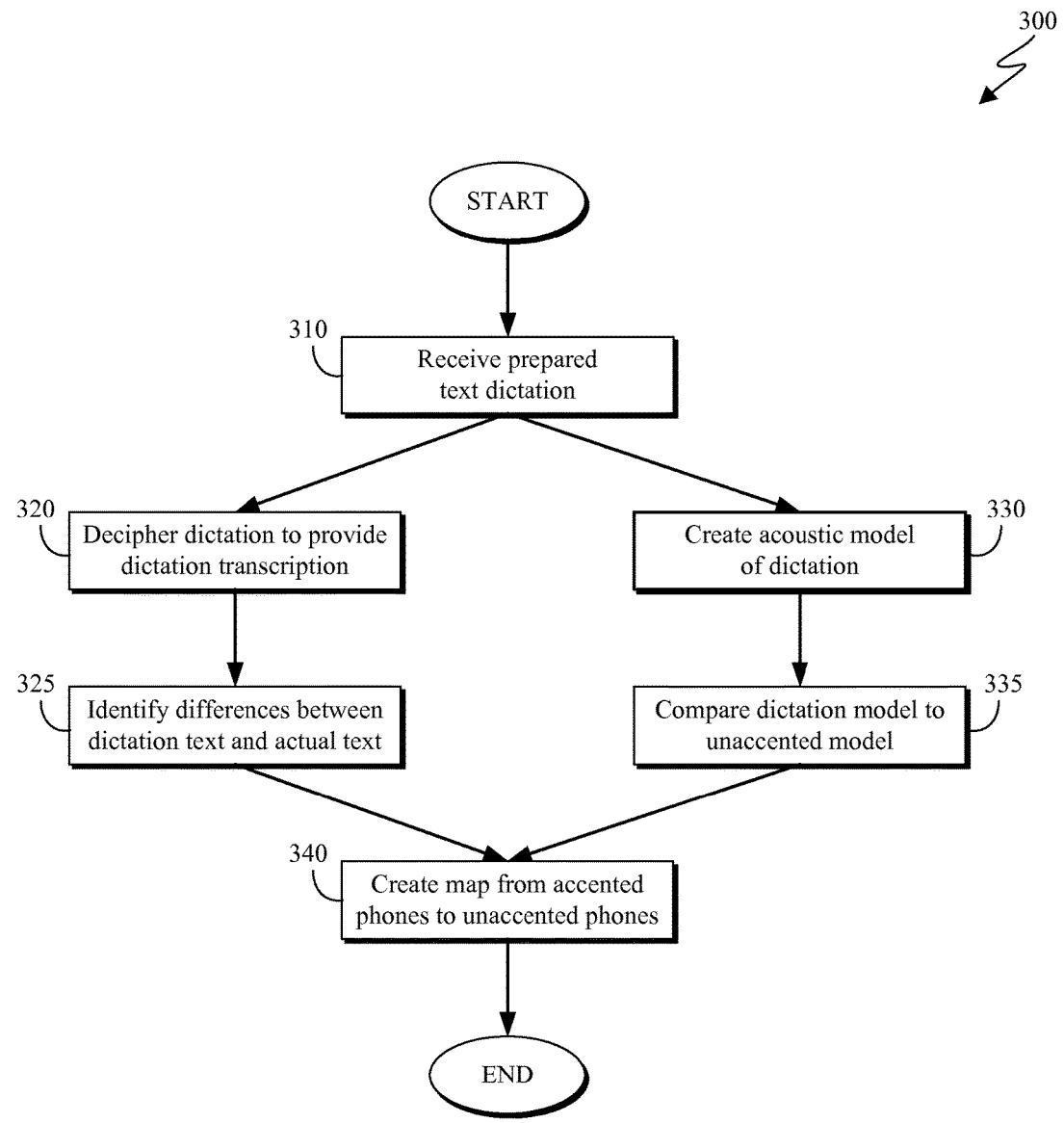
FIG. 3 is a flowchart depicting an accent map creation method in accordance with some embodiments of the present invention.

FIG. 3 is a flowchart depicting an accent map creation method 300 in accordance with some embodiments of the present invention. As depicted, accent map creation method 300 includes receiving (310) a dictation of a prepared text, deciphering (320) the dictation to provide a dictation text, identifying (325) differences between the dictation transcription and an actual transcription, creating (330) an acoustic model of the dictation, comparing (335) the acoustic model of the dictation to an acoustic model of an unaccented dictation, and creating (340) a map from accented phones to unaccented phones. Accent map creation method 300 may enable accented phone patterns to be replaced with unaccented phone patterns within an audio signal comprising speech.

Receiving (310) a dictation of a prepared text may include receiving audio input comprising a dictation of a prepared text. The text may be dictated by a user with a specified accent such that a phone level error point may be determined with respect to the specified accent. The prepared text may be a text created specifically to encompass a plurality of phone patterns to enable a full mapping between accented phone patterns and unaccented phone patterns.

Deciphering (320) the dictation to provide a dictation transcription may include analyzing and transcribing the text to provide a phone level accented text transcription. The transcription of the dictation may be a transcription of the phonetic pronunciation of the dictation, and not a transcription of the words or phrases in the text. Transcribing the dictation at a phone level enables a phone level error point to be determined.

Identifying (325) differences between the dictation text and an unaccented transcription may include comparing the dictation transcription to the unaccented transcription and identifying any phones that differ between the two transcriptions. Identifying (325) differences may further include compiling a list of phones that differ between the dictation transcription and the unaccented transcription. This list, comprising accented phones and the corresponding unaccented phones, may be used to create a map of which accented phones are to be replaced, and with which unaccented phones they should be replaced.

Creating (330) an acoustic model of the dictation to an acoustic model of an unaccented dictation of the prepared text may include using existing modeling software to create an acoustic model of the dictation transcription and an acoustic model of the unaccented transcription. In other embodiments, the acoustic model of the unaccented transcription may be received from another source. Acoustic models are used in automatic speech recognition to represent the relationship between audio signals and the linguistic units that make up speech, or in this case, phones. In one embodiment, the acoustic models are hidden Markov models, which are statistical models in which a system being modeled is assumed to be a Markov process with unobserved states. A Markov process is a process that adheres to the Markov property, which states that the future states of the process depend only upon a present state, not the sequence of events that led to it. A hidden Markov model in particular is a model in which some states are hidden, but outputs, which are dependent on the states, are visible.

Comparing (335) the dictation acoustic model and the unaccented acoustic model may include calculating a similarity distance corresponding to the acoustic model of the dictation and the acoustic model of the unaccented speech. In some embodiments, the similarity distance is a distance between a point on the dictation acoustic model and the unaccented acoustic model. This similarity distance may be used to determine whether or not a phone is severely accented to the point of needing replacement. For example, it may be indicated that phones for which the similarity distance is greater than X may be too different to understand, and therefore should be replaced. Phones for which the similarity distance is less than X need not be replaced—that is, phones that may not be an exact match but are very minimally different are likely close enough to be understood, and therefore need not be replaced by unaccented phones. In some other embodiments, phones exhibiting any similarity distance other than zero are replaced.

Creating (340) a map from accented phones to unaccented phones may include creating a decision tree for replacing accented phones. In one embodiment, the decision tree is configured to compare each phone in the received audio signal to a set of all accented phones as identified by steps 320-335. With respect to each accented phone in the set, if a phone from the received audio input signal matches the accented phone, then the phone is to be replaced with a corresponding unaccented phone as identified with respect to the dictation transcription and the unaccented transcription. The map may also include instructions to leave any phones that do not match a phone in the accented phone set unaltered.

Figure 4:
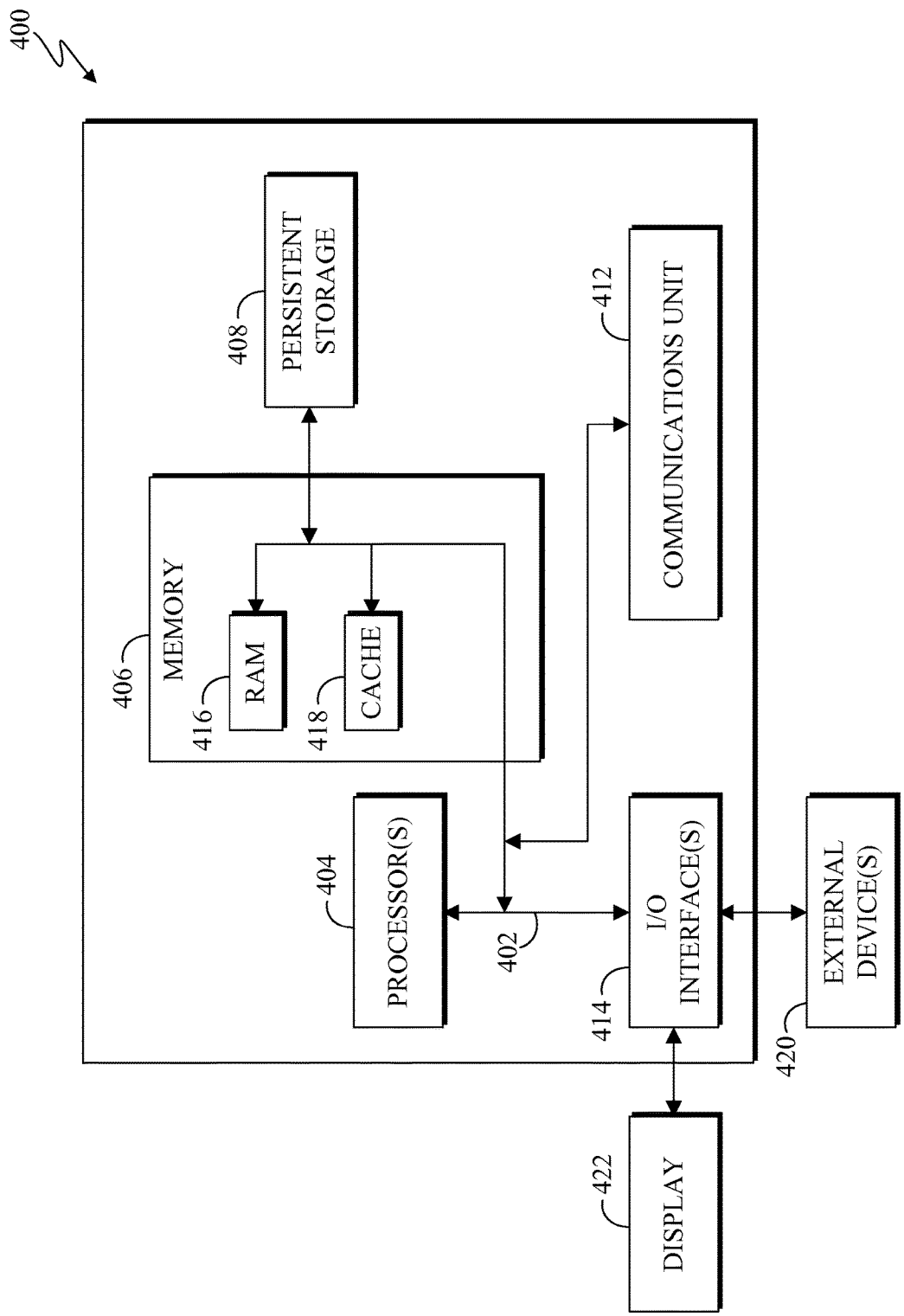
FIG. 4 depicts a block diagram of components of a computer, in accordance with some embodiments of the present invention.

FIG. 4 depicts a block diagram of components of computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving a dictation of a prepared text;
   creating an acoustic model of the dictation of the prepared text;

comparing the acoustic model of the dictation to an acoustic model of an unaccented pronunciation of the prepared text to provide one or more accented phone patterns corresponding to an accent class;

updating an accent database entry corresponding to the accent class to include the one or more accented phone patterns;

receiving an audio input signal comprising speech;

determining an accent class corresponding to the speech;

identifying an accented phone pattern within the speech;

replacing the accented phone pattern with an unaccented phone pattern according to the accent database entry;

generating an unaccented output signal from the unaccented phone pattern; and outputting the generated unaccented output signal.

2. The method of claim 1, wherein analyzing the dictation comprises identifying phone patterns where the acoustic model of the dictation differs from the acoustic model of the unaccented pronunciation of the prepared text.

3. The method of claim 1, further comprising decoding the dictation to provide a phonetic transcript of the dictation.

4. The method of claim 3, wherein analyzing the dictation comprises comparing the phonetic transcript of the dictation to a phonetic transcript of the prepared text to provide a set of phone patterns that differ between them.

5. The method of claim 1, further comprising providing the unaccented output signal to a user.

6. A computer program product comprising:

one or more computer readable storage media and program instructions stored on the one or more computer readable storage media, the program instructions comprising instructions to:

receive a dictation of a prepared text;

create an acoustic model of the dictation of the prepared text;

compare an acoustic model of the dictation to an acoustic model of an unaccented pronunciation of the prepared text to provide one or more accented phone patterns corresponding to an accent class;

update an accent database entry corresponding to the accent class to include the one or more accented phone patterns;

receive an audio input signal comprising speech;

determine an accent class corresponding to the speech;

identify an accented phone pattern within the speech;

replace the accented phone pattern with an unaccented phone pattern according to the accent database entry;

generate an unaccented output signal from the unaccented phone pattern; and output the generated unaccented output signal.

7. The computer program product of claim 6, wherein program instructions to analyze the dictation comprise instructions to identify phone patterns where the acoustic model of the dictation differs from the acoustic model of the unaccented pronunciation of the prepared text.

8. The computer program product of claim 6, further comprising program instructions to decode the dictation to provide a phonetic transcript of the dictation.

9. The computer program product of claim 8, wherein program instructions to analyze the dictation comprise instructions to compare the phonetic transcript of the dictation to a phonetic transcript of the prepared text to provide a set of phone patterns that differ between them.

10. The computer program product of claim 6, further comprising program instructions to provide the unaccented output signal to a user.

11. A computer system comprising:

one or more computer processors;

one or more computer-readable storage media;

program instructions stored on the computer-readable storage media for execution by at least one of the one or more processors, the program instructions comprising instructions to:

receive a dictation of a prepared text;

create an acoustic model of the dictation of the prepared text;

compare an acoustic model of the dictation to an acoustic model of an unaccented pronunciation of the prepared text to provide one or more accented phone patterns corresponding to an accent class;

update an accent database entry corresponding to the accent class to include the one or more accented phone patterns;

receive an audio input signal comprising speech;

determine an accent class corresponding to the speech;

identify an accented phone pattern within the speech;

replace the accented phone pattern with an unaccented phone pattern according to the accent database entry;

generate an unaccented output signal from the unaccented phone pattern; and output the generated output signal.

12. The computer system of claim 11, wherein program instructions to analyze the dictation comprise instructions to identify phone patterns where the acoustic model of the dictation differs from the acoustic model of the unaccented pronunciation of the prepared text.

13. The computer system of claim 11, further comprising program instructions to decode the dictation to provide a phonetic transcript of the dictation.

14. The computer system of claim 13, wherein program instructions to analyze the dictation comprise instructions to compare the phonetic transcript of the dictation to a phonetic transcript of the prepared text to provide a set of phone patterns that differ between them.

* * * * *